United States Patent Office 3,207,669
Patented Sept. 21, 1965

3,207,669
CONTROL SYSTEMS FOR NUCLEAR REACTORS
Sydney Fawcett, Hale Barnes, and Ronald Hugh Campbell, Bowdon, England, assignors to the United Kingdom Atomic Energy Authority, London, England
Filed June 26, 1961, Ser. No. 119,655
Claims priority, application Great Britain, July 6, 1960, 23,618/60
1 Claim. (Cl. 176—24)

This invention relates to control systems for nuclear reactors.

It is well established that a nuclear reactor has conventionally an "operational" control system (which is usually manual but may be predominantly manual with a small automatic element) and an "emergency" shut-down control system, the latter now being provided in two forms (called "primary" and "secondary") arranged so that the secondary one will operate in circumstances preventing operation of the primary one. It is the practice to arrange that an emergency shut-down control system operates by a release mechanism so that, with the appearance of emergency conditions, control elements operate quickly and substantially unrestrained under gravitational forces to swamp any excess reactivity possessed by the reactor, thereby rendering it safe and then hold the reactor in a shut-down condition.

A reactor shut down by the operation of an emergency control system can give rise to a number of undesirable events. In the first place the sudden change in reactivity imposed by rapidly operated control elements applies a thermal shock throughout the reactor system, the shock being felt mostly in the fuel elements of the reactor; a place where it is least desired. In the second place a very unwelcome disturbance is applied to any electrical grid network which is being fed by electricity derived from the reactor power. In the third place a complete shut down may cause delayed start up subsequently due to xenon poisoning.

According to the present invention a nuclear reactor has an operational control system for effecting stable control of the reactor with normal variations in reactor performances, a first shut down system (the restrained system) separate from said operational control system, means detecting abnormal variations in reactor performance, means for moving irreversibly said first shut down system at a restrained rate in a direction to reduce reactivity of the reactor on detection of said abnormal conditions, means for arresting the movement of the first shut down system on elimination of said abnormal conditions, a second shut down system (the primary emergency system) operating at a faster rate than said first shut down system, means for detecting conditions more severe than said abnormal conditions and means for releasing said second shut down system on detection of said more severe conditions to shut down the reactor.

Figure 1:
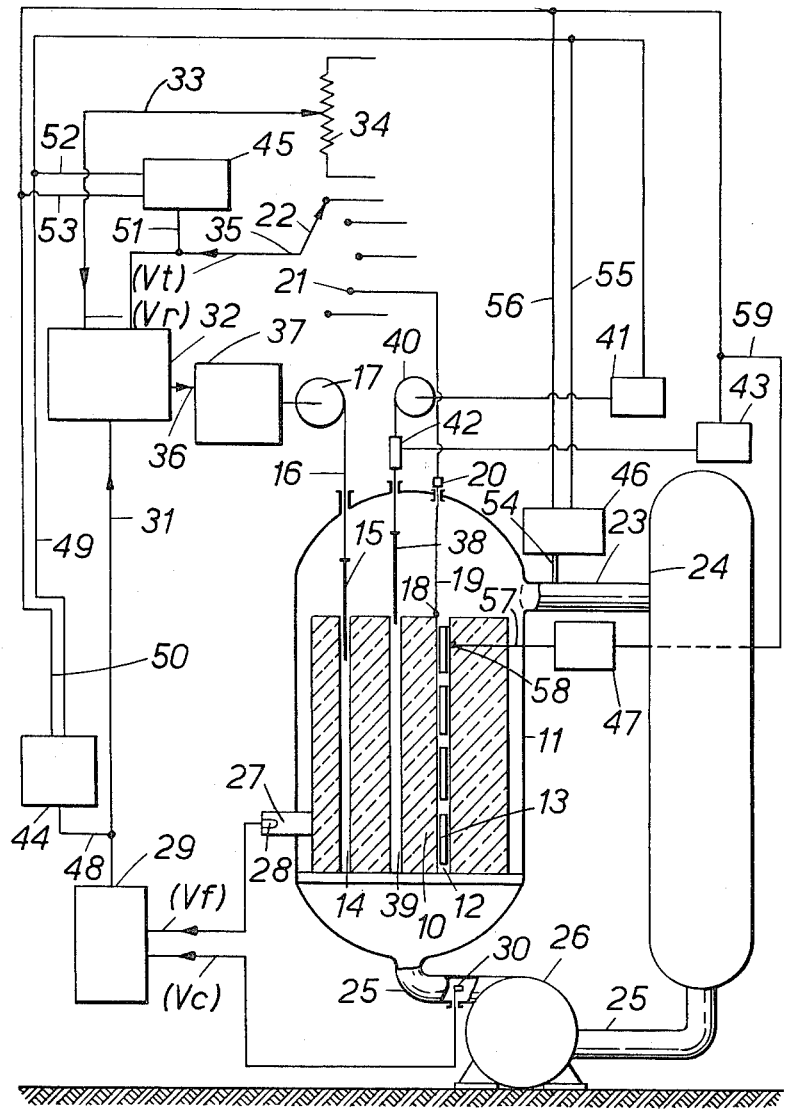
Figure 2:
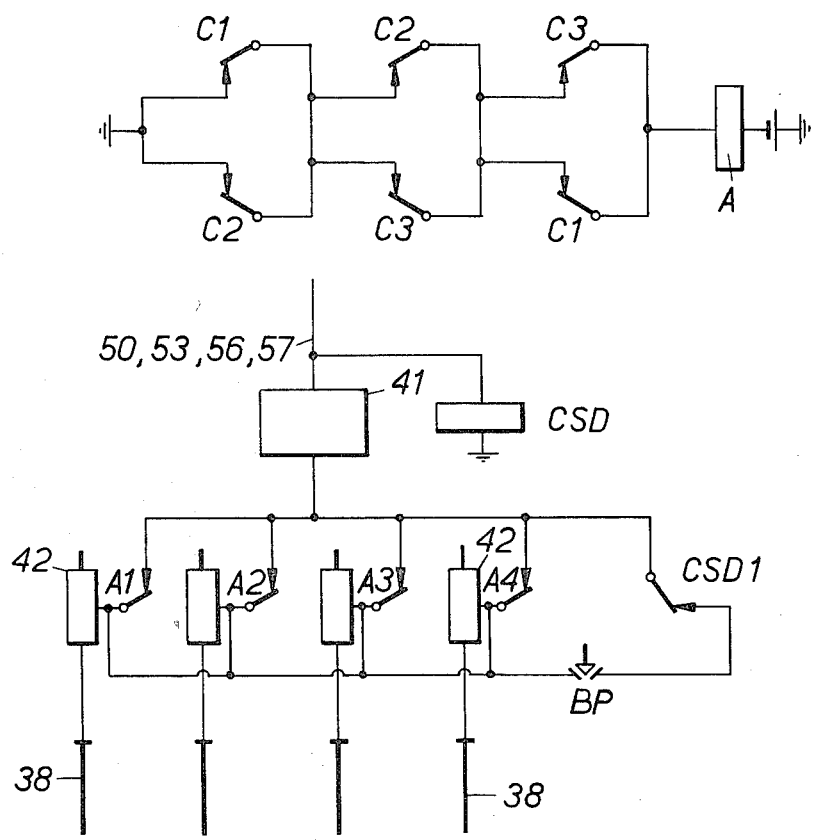

The invention will now be further described with reference to the accompanying drawing wherein FIG. 1 is a diagram of a nuclear reactor and its control system and FIG. 2 is a circuit diagram.

FIG. 1 shows an automatic operational control system for "fine" control rods disclosed in British Patent No. 887,392 modified in accordance with the present invention to show the features of restrained shut down operable on the receipt of the following abnormal conditions:

(i) Temperature of coolant emerging from a fuel channel 20° C. above normal
(ii) Reactor power coolant flow ratio 8% above normal
(iii) Coolant pressure 8% above normal and the features of emergency shut-down (sometimes referred to as "Scram" shut down) on receipt of the following severe conditions:

(i) Temperature of coolant emerging from a fuel channel 30° C. above normal
(ii) Power to coolant flow ratio 15% above normal
(iii) Fuel temperature 30° C. above normal
(iv) Rate of fall of coolant pressure at 20 p.s.i./min.

A nuclear reactor core structure 10 is supported in a pressure vessel 11. The core structure is penetrated by a number of fuel element channels 12 (only one being shown) equipped with fuel elements 13. The structure is provided with a number of "fine" control rod channels 14 (only one being shown) each equipped with a "fine" control rod 15 supported by a cable 16 attached to a winch and motor 17. Each fuel element channel has a thermocouple 18 for measuring the temperature of gas emerging from the channel. The thermocouple 18 has a lead 19 to a connecting box 20 and thence to an outlet 21 of a multi-position switch 22 for selecting as desired any one of several similar thermocouples. The availability of several thermocouples ensures that there is always one which can be used as a standby in the event of a thermocouple failure. The reactor is gas cooled by carbon dioxide circulated upwards through the reactor core and thence, externally of the pressure vessel, over a closed path composed of a duct 23, a steam generator 24, to which water for steam raising is supplied, and a duct 25 having a circulator 26. A number of similar gas coolant circuits are normally provided, only one being shown in this instance. A graphite thermal column 27 is provided for thermalizing a sample of the fast neutrons. This column contains a neutron flux measuring ion chamber 28 having its output connected to circuit 29. The duct 25 is provided with a flow meter 30 to derive a voltage analogue of the flow rate which is also fed to the circuit 29. Circuit 29 subtracts the flow meter voltage signal from the ion chamber voltage signal, differentiates it with respect to time and feeds the result via a connection 31 to one input of an amplifier 32. A connection 33 takes a voltage derived from a potentiometer 34 representing a pre-set temperature to a second input of amplifier 32 and a connection 35 takes the voltage derived from the thermocouple 18 to a third input of the amplifier 32. The single output from the amplifier 32 is taken by a connection 36 to a controller 37 which controls the movement of winch and motor 17 and hence the control rod 15.

The primary control term in the apparatus described above is that obtained in the form of an error signal from the voltage ($Vt$) derived from the thermocouple 18 together with the resetting voltage ($Vr$) derived from the potentiometer 34. The additional control term is obtained from the differential of the voltage ($Vf$) derived from the ion chamber 28 together with the voltage ($Vc$) derived from the flow meter 30.

It is arranged that the voltage $Vf$ is scaled to the same order of magnitude as the voltage $Vc$. In this event circuit 29 can either take the ratio of $Vf$ and $Vc$ or subtract $Vc$ from $Vf$ before differentiation as the same effect is produced by either. The latter is preferred as being simpler. The quantities $Vf$ and $Vc$ need not be measured very accurately as differentiation of their ratio (or difference) follows and hence the controller 37 is only concerned with their rate of change and this is only used as an additional term to give increased stability.

Whilst only one automatic control loop has been described above, the core structure 10 may be divided into a number ($n$) of zones each provided with its own loop. This would require $n$ control rods under loop control and a device could be provided to compare the positions of the control rods with one another which would raise an alarm should one of them deviate. If deviation should occur the loops associated with the other control rods will tend to hold the total flux constant by changing activity in their own zones.

The apparatus described above would be monitored by a control operator whose main function would be to hold the automatically controlled "fine" rods 15 near to their centre of travel by trimming a separate bank of "coarse" control rods. The operator would be assisted by warnings at 25% above and below centre position of the loop controlled rods should he inadvertently allow such movement to take place.

The apparatus described above provides an automatic control system for "fine" control rods. The following additions to this system are now presented:

(i) "Coarse" control absorber rods 38 are provided movable irreversibly into channels 39 by a winch 40 under the control of a controller 41, to provide a restrained shut down system which can be manually restored.

(ii) A clutch 42 is provided in association with the rods 38 to allow "Scram" shut down by release of the rods. The clutch is under the control of a primary emergency controller 43.

(iii) Alarm signal generators 44, 45, 46 and 47 are installed to provide signals in the event of the restrained shut down conditions or "Scram" shut down conditions arising as scheduled above.

Generator 44 has an input connection 48 which picks up the reactor power/coolant flow ratio signal. It has an output connection 49 for signalling restrained shut down conditions (8% above normal) and a connection 50 for signalling "Scram" conditions (15% above normal). Generator 45 has an input connection 51 which picks up the temperature of coolant emerging from a fuel element channel. It has an output connection 52 for signalling restrained shut down conditions (20° C. above normal) and a connection 53 for signalling "Scram" conditions (30° C. above normal.) Generator 46 receives coolant pressure along a pipe 54 and is capable of producing two output signals, the first being a signal into output connection 55 for restrained shut down when the pressure rises (8% above normal) and the second being a signal into output connection 56 for "Scram" conditions when the rate of fall of coolant pressure exceeds 20 p.s.i./minute. It is observed that "Scram" conditions are not started at pressures greatly in excess of 8% above normal as such conditions cannot be realised as the conventional pressure blow-off valves will operate (typically at 10% above normal). Generator 47 has an input connection 57 from a fuel element thermocouple 58 and an output connection 59 to signal "Scram" conditions.

A secondary emergency shut down will normally be provided in addition to the primary emergency shut down afforded by the clutch 42. This forms no part of the invention and therefore is only referred to incidentally. Typically it will be a ball shut down device, that is a device having ball of magnetic absorber material restrained from entering the reactor by a magnetic field which is caused to collapse in the event of emergency conditions occurring at a level higher than those reached by transients consequent upon operation of the primary emergency (Scram) shut down. Typically, the secondary emergency shut down would operate at 100° C. above normal for fuel temperatures, 50% above normal for flux to coolant flow ratio and with a coolant pressure fall rate of 200 p.s.i./minute.

FIG. 1 has been described, for reasons of clarity, as a "single-line" diagram. In accordance with the high standards demanded for control the alarm signal generators 44, 45, 46 and 47 are provided in duplicate for each input and the duplicate generators are provided in groups of three (that is, six altogether) so that the "two out of three" principle (itself known and referred to in more detail below) can be used.

The alarm signal generators 44, 45, 46 and 47 are electronic circuits (preferably transistorised) of the known type employing relays held operated by currents passing through electronic switches (values or transistors), the switches being biassed off by increased input signals so that the relays release and thereby signal to the controllers 41 or 43.

The control rods 15 can be operated at a rate to cause a change of $10^{-5}$ in $k$ per second (that is, one "millinile" per second). The control rods 38 can be similarly operated when controlled by the winch 40. When released by the clutch 42 they cause a large change in $k$, typically in the range of 1–3% per second.

In FIG. 2 there is shown a typical "two out of three" protection circuit. (This has become a common circuit for control purposes and it requires the existence of at least two conditions out of a possible three before an operation can take place. In this way one out of three pieces of equipment can be out of service without losing emergency facilities and single spurious or ephemeral conditions cannot cause needless shut down.) The circuit has three pairs of contacts C1, C2 and C3 each pair being associated with one of an appropriate group of three alarm signal generators and connected in a circuit, as shown, to a relay A. Relay A has a series of contacts A1, A2, A3 etc. which are connected to respective clutches 42 associated with control rods 38. Now it so happens that relay A must be subjected to routine testing and, in order that the clutches 42 should not be released during the test, a temporary by-pass connection is applied across the contacts A1, A2, A3 etc. so that they can be opened during the test. However, this has the effect of removing primary emergency facilities from the reactor during the test and, by coincidence, an emergency may arise at this time with serious results. Hence, in furtherance of the invention, the by-pass contact BP has in series with it a controlled shut down contact CSD1. An abnormal condition now arising will cause a signal to pass to the emergency shut down controller 43 and it is arranged that this signal operates a relay CSD in the controller 41 to open contact CSD1. Whilst this may cause an emergency shut down under conditions only justifying a restrained shut down this is preferable to the alternative of risking failure to shut down on the occurrence of emergency conditions.

The restrained shut down technique of the invention ensures that abnormal conditions cause only a minimised changed in the performance of the reactor. At the same time it may allow the reactor to be continued in operation (admittedly at a lower power) whilst faults can be investigated and corrected. Accordingly the incidence of severe thermal shock to the reactor is reduced, output is maintained at a reduced level where otherwise it would be lost and the problems that can be created by xenon poisoning are reduced. Routine testing of the control facilities can be carried out with the reactor on load without risk of failure to detect emergency conditions.

We claim:

In a nuclear reactor, a reactor control system responsive to a first series of variations in reactor conditions below a predetermined level of magnitude, a first reactor shut-down system responsive to a second series of variations in reactor conditions which are of greater magnitude than those of said first series, said first shut-down system having means for reducing reactivity of the reactor at a restrained rate, arresting means for said first shut-down system responsible to the elimination of said second series of variations, a second reactor shut-down system responsive to a third series of variations in reactor conditions of greater magnitude than those of said second series and operable to reduce reactivity of the reactor at an unrestrained rate thereby being fast enough to overhaul said first shut-down system and so shut down the reactor, the second shut-down system being electrically operated and having short circuiting means provided which render said second shut-down system temporarily ineffective, and means responsive to said second series for overriding the effect of said short circuiting means and thereby allowing shut down of the reactor.

References Cited by the Examiner

UNITED STATES PATENTS

| | | | |
|---|---|---|---|
| 2,781,308 | 2/57 | Creutz et al. | 176—33 |
| 2,931,763 | 4/60 | Dever | 176—22 |
| 2,973,458 | 2/61 | Nye | 176—22 X |
| 3,079,315 | 2/63 | Le Baud et al. | 176—24 |
| 3,087,884 | 4/63 | Long et al. | 176—35 |
| 3,088,903 | 5/63 | Firth | 176—34 |

FOREIGN PATENTS 823,429  11/59  Great Britain.

CARL D. QUARFORTH, *Primary Examiner.*

REUBEN EPSTEIN, *Examiner.*